(12) United States Patent
Kuntzelman

(10) Patent No.: US 9,297,498 B1
(45) Date of Patent: Mar. 29, 2016

(54) GREASE GUN ADAPTER

(71) Applicant: Plews, Inc., Dixon, IL (US)

(72) Inventor: Toby Kuntzelman, Pecatonica, IL (US)

(73) Assignee: Plews, Inc., Dixon, IL (US)

( * ) Notice: Subject to any disclaimer, the term of this patent is extended or adjusted under 35 U.S.C. 154(b) by 6 days.

(21) Appl. No.: 14/268,367

(22) Filed: May 2, 2014

(51) Int. Cl.
*G01F 11/00* (2006.01)
*F16N 3/12* (2006.01)
*F16N 11/02* (2006.01)
*B05C 17/01* (2006.01)
*B05C 17/005* (2006.01)

(52) U.S. Cl.
CPC .............. *F16N 3/12* (2013.01); *B05C 17/00596* (2013.01); *B05C 17/01* (2013.01); *F16N 11/02* (2013.01)

(58) Field of Classification Search
CPC ......... F16N 3/12; F16N 11/02; G01F 11/022; B65D 1/0246; B65D 39/10; B65D 41/06; B65D 41/36; B65D 47/125; B05C 17/00596
USPC ............ 222/256, 262, 325–327, 372; 285/35, 285/361, 396, 402; 184/28, 105.2
See application file for complete search history.

(56) References Cited

U.S. PATENT DOCUMENTS

| | | | | |
|---|---|---|---|---|
| 2,504,683 | A * | 4/1950 | Harnley | 222/189.08 |
| 2,610,091 | A * | 9/1952 | Deutsch | 222/325 |
| 3,021,036 | A * | 2/1962 | Guedon | 222/256 |
| 3,341,085 | A * | 9/1967 | Sundholm | 222/260 |
| 3,384,081 | A * | 5/1968 | Castiglione | 604/183 |
| 5,741,084 | A * | 4/1998 | Del Rio et al. | 403/349 |
| 6,395,006 | B1 * | 5/2002 | Burchett | 606/93 |
| 7,337,927 | B2 | 3/2008 | Linkletter et al. | |
| 7,377,406 | B2 | 5/2008 | Linkletter et al. | |
| 7,469,803 | B2 | 12/2008 | Weems et al. | |
| 7,527,176 | B2 | 5/2009 | Weems et al. | |
| 8,297,476 | B2 | 10/2012 | Weems et al. | |
| 2002/0179645 | A1 * | 12/2002 | So | 222/156 |
| 2010/0116850 | A1 * | 5/2010 | Weems et al. | 222/256 |
| 2011/0073680 | A1 * | 3/2011 | Pellin et al. | 239/526 |
| 2013/0087584 | A1 * | 4/2013 | Guo | 222/323 |

* cited by examiner

*Primary Examiner* — J. Casimer Jacyna
*Assistant Examiner* — Benjamin R Shaw
(74) *Attorney, Agent, or Firm* — Bay Area Technology Law Group PC

(57) ABSTRACT

A spring loaded grease gun having a cylindrical barrel which is sized to receive a grease cartridge. The cylindrical barrel has a first end and second end, the first end having an opening to receive a spring-loaded rod and the second end being threaded to receive a head cap assembly. An adapter is provided having a cylindrical body and a threaded interior surface for mating with the threaded second end of the cylindrical barrel and an exterior surface having a plurality of rectangularly shaped protrusions. The head cap assembly has a pistol type dispenser appended to a cylindrical cup which has an inner surface sized to receive the cylindrical body of the adapter. The inner surface of the cylindrical cup includes a plurality of cylindrical cup protrusions which are sized and positioned to mate with the rectangularly shaped protrusions emanating from the exterior surface of the adapter for fixedly joining the head cap assembly to the adapter.

9 Claims, 3 Drawing Sheets

GREASE GUN ADAPTER

TECHNICAL FIELD

The present invention involves an adapter for use with a spring-loaded grease gun. By employing the present adapter, the grease gun head cap assembly can be applied to and removed from the barrel of the grease gun without the need to deal with threads to speed the process and eliminate cross threading which can oftentimes make the grease gun unworkable.

BACKGROUND OF THE INVENTION

Grease guns have been employed in a wide variety of environments. Generally, grease guns are used to inject grease under pressure through specialized fittings, called Zerk fittings, to lubricate bearings, gears and other moving parts. Commonly, grease guns can be powered manually via a lever or trigger pump or automatically via air or electric power and accept standard grease cartridges which may be filled with nearly any weight of grease from lightweight lubricants to heavy axle grease. Replacing the cartridge consists of inserting a new cartridge, priming the gun and bleeding off trapped air.

In use, the head of the grease gun is unscrewed from its barrel by twisting it counterclockwise. A handle which is spring loaded by virtue of an interior spring assembly (illustrated by element 15 of FIG. 1) is retracted into the barrel and locked in place by virtue of a notch in the rod and detent at the base of the barrel. The spent cartridge is removed by pulling it out through the top end of the barrel and replaced by inserting a new cartridge into the barrel, open end down. The head is then reapplied to the barrel and the rod released and pushed to remove trapped air. Thereupon, the head is tightened and a bleeder valve is pressed to release any remaining air. A movable lever or alternative means is used to initiate grease flow out of the hose. or coupler fitting smoothly.

Due to the environment in which grease guns of this type are employed, it is common to experience problems with the threaded connection between the head assembly and threads of the barrel. Users of these types of grease guns often find it necessary to repeatedly remove the head assembly from the barrel and when debris and foreign matter clog threads, these threads as well as the adjoining threads on of the head cap assembly bind which, in extreme cases, can render the grease gun useless.

It is thus an object of the present invention to provide an adapter between the grease gun barrel and head cap assembly which would obviate the need to threadably connect the head cap assembly to the barrel.

This and further objects will be more readily apparent when considering the following disclosure and appended claims.

SUMMARY OF THE INVENTION

In a spring-loaded grease gun having a cylindrical barrel and head cap assembly, said cylindrical barrel being sized to receive a grease cartridge and having first and second ends, said first end having an opening to receive a spring-loaded rod and the second and being threaded to receive said head cap assembly, the improvement comprising an adapter, said adapter having a cylindrical body and a threaded interior surface for mating with the threaded second end of said cylindrical barrel and an exterior surface having a plurality of rectangularly shaped protrusions, said head cap assembly having a pistol type dispenser appended to a cylindrical cup, said cylindrical cup having in interior surface sized to receive said cylindrical body of said adapter, said inner surface of said cylindrical cup comprising a plurality of cylindrical cup protrusions sized and positioned to mate with said rectangularly shaped protrusions emanating from the exterior surface of said adapter for frictionally joining said head cap assembly to said adapter.

DETAILED DESCRIPTION OF THE INVENTION

Figure 1:
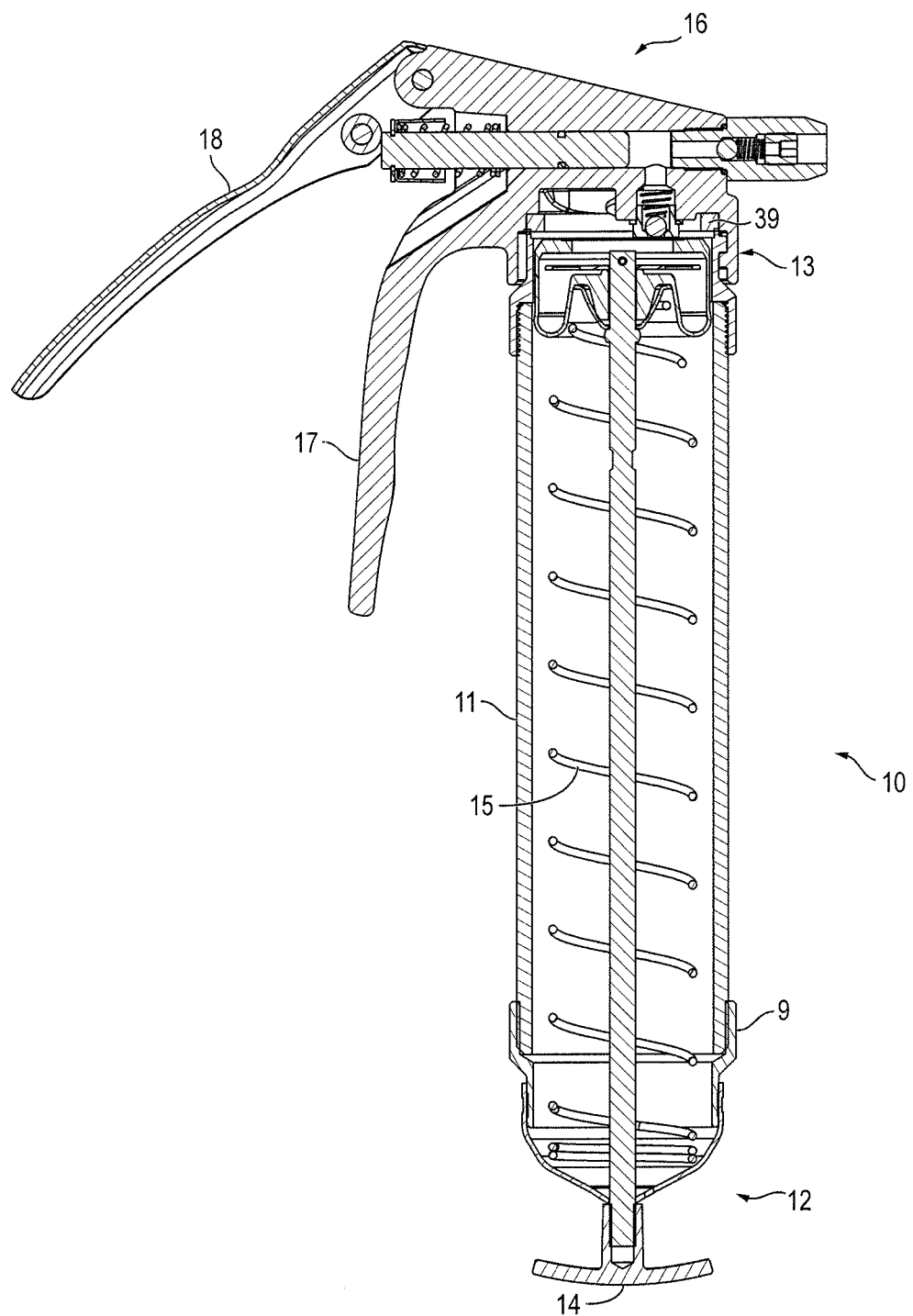
FIG. 1 is a cross-sectional side view of the pistol type spring-loaded grease gun of the present invention.
Figure 2:
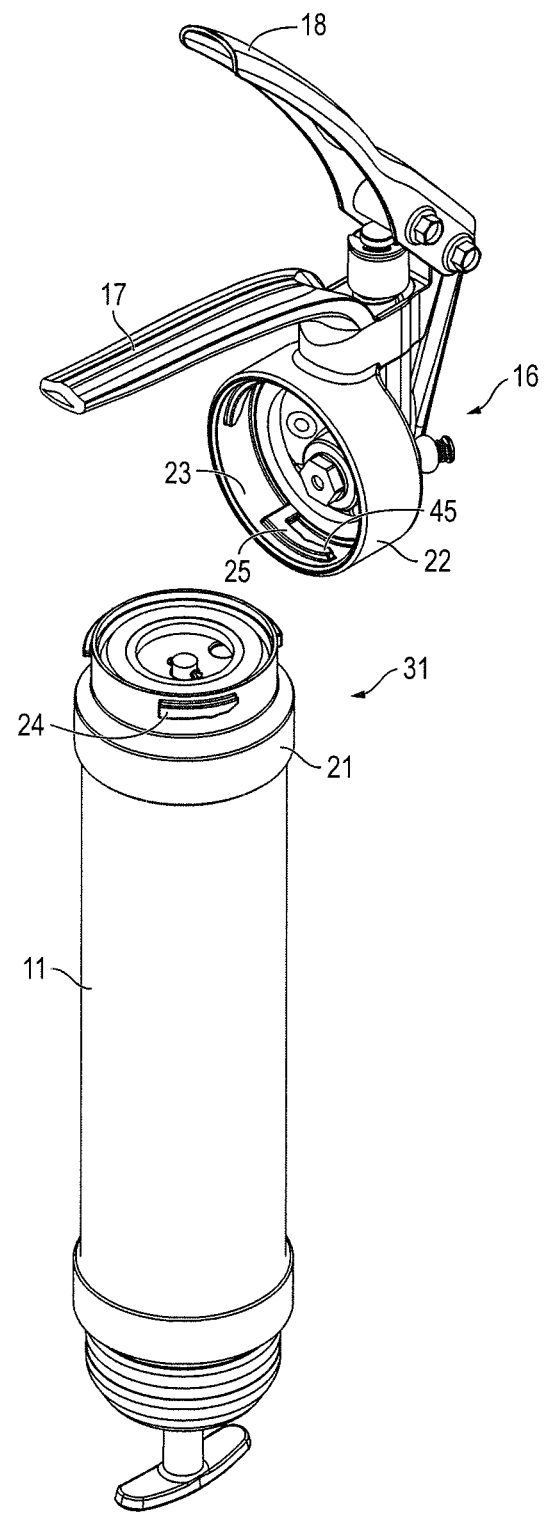
FIG. 2 is a perspective view of the pistol type spring-loaded grease gun shown in FIG. 1.

Novel features which are characteristic of the invention, as to organization and method of operation, together with further objects and advantages thereof will be better understood from the following description considered in connection with the accompanying drawings, in which preferred embodiments of the invention are illustrated by way of example. It is to be expressly understood, however, that the drawings are for illustration description only and are not intended as definitions of the limits of the invention. The various features of novelty which characterize the invention are recited with particularity in the claims.

There has been broadly outlined more important features of the invention in the summary above and in order that the detailed description which follows may be better understood, and in order that the present contribution to the art may be appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important therefore, that claims be regarded as including such equivalent constructions insofar as they do not depart from the spirit and scope of the present invention.

Certain terminology and the derivations thereof may be used in the following description for convenience and reference only, and will not be limiting. For example, words such as "upward," "downward," "left," and "right" refer to directions in the drawings to which reference is made unless otherwise stated. Similar words such as "inward" and "outward" refer to directions toward and away from, respectively, the geometric center of a device or area and designated parts thereof. Reference in the singular tense include the plural and vice versa, unless otherwise noted.

In turning first to FIG. 1, pistol type spring-loaded grease gun 10 is shown having cylindrical barrel 11 sized to receive a grease cartridge (not shown). Cylindrical barrel 11 has first end 12, closed by cap 9 which is open to receive spring-loaded rod 14 and second end 13 possessing threads 33 to receive adapter 31. Without adapter 31, threaded region 33 at end 13 of barrel 11 would be joined to complementary threads of a typical lever assembly of the prior art.

Figure 3:
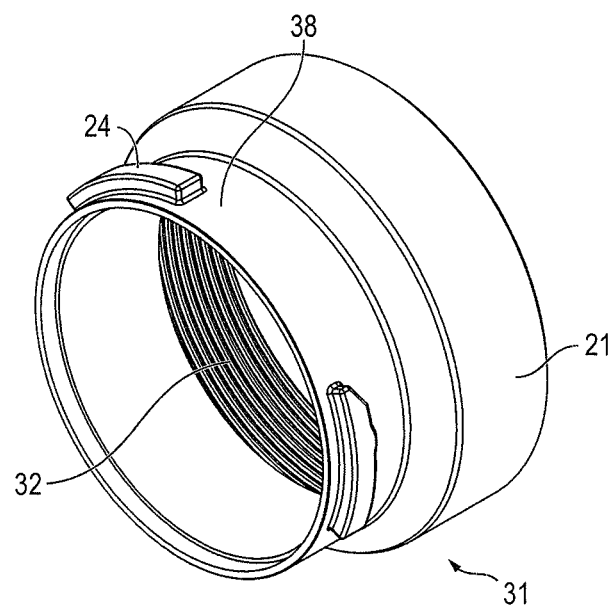
FIG. 3 is a perspective view of the adapter of the present invention.
Figure 4:
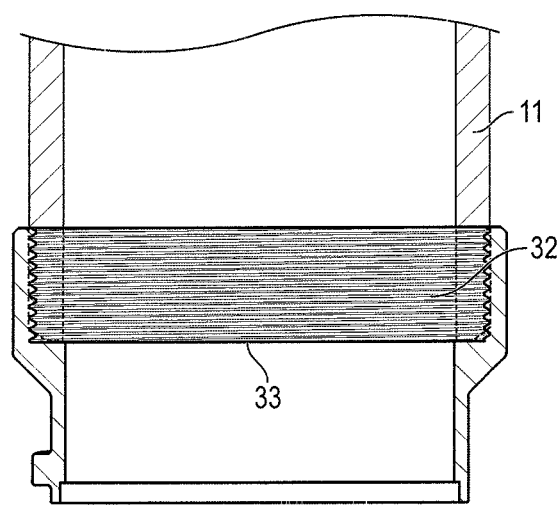
FIG. 4 is a partial end view of a grease gun barrel joined to the adapter of the present invention.

The improvement provided by the present invention is in the form of adapter 31 as best depicted in FIG. 3. Adapter 31 is provided with cylindrical body 21 and threaded interior 32 for mating with threaded second end 33 of cylindrical barrel 11. Adapter 31 is provided, on its exterior surface, with a plurality of rectangularly shaped protrusions 24, the purpose of which will become readily apparent in the discussion which follows.

Head cap assembly 16, can employ any kind of pistol type dispenser, the varieties of which are well known to the art. As an example, illustrated is a lever assembly comprising first fixed lever arm 17 and second spring biased lever arm 18, both first and second lever arms being appended to cylindrical cup 22. Cylindrical cup 22 is characterized as having inner surface 23 sized to receive cylindrical body portion 38 of adapter 31. Inner surface 23 of cylindrical cup 22 comprises a plurality of cylindrical cup protrusions 2.5 sized and positioned to mate with rectangularly shaped protrusions 24 emanating from external cylindrical surface 38 of adapter 31 for fixedly, joining head cap assembly 16 to adapter 31.

As noted, this method of mating the barrel of a grease gun to the head cap assembly can be used on all styles of grease guns including lever style, pneumatic, battery operated and push-style grease guns that do not incorporate the levers 17 and 18 as illustrated.

As a preferred embodiment, resilient seal 39 such as a rubber O-ring or the like is positioned within interior 23 of cylindrical cup 22 such that when head cap assembly 16 is fixedly applied to adapter 31, seal 39 is compressed.

It is further noted that as a preferred embodiment, three rectangularly shaped protrusions 24 are equally spaced on surface 38 of adapter 31. Similarly, three cylindrical cup protrusions 2.5 are equally spaced on the interior surface 23 of cylindrical cup 22. Cylindrical cup protrusions 2.5 are characterized as having leading edges 45 sized for capturing rectangularly shaped protrusions 24. In use, head cap assembly 16 is applied to adapter 31 and by rotatably moving head cap assembly 16 with respect to adapter 31 the parts are compressed against one another. As noted previously, when resilient seal 39 is employed, the seal is further compressed thus preventing unwanted seepage of grease through the adapter-head cap assembly interface.

The above disclosure is sufficient to enable one of ordinary skill in the art to practice the invention, and provides the best mode of practicing the invention presently contemplated by the inventor. While there is provided herein a full and complete disclosure of the preferred embodiments of the invention, it is not desired to limit the invention to the exact construction, dimensions, relationships, or operations as described.

Various modifications, alternative constructions, changes and equivalents will readily occur to those skilled in the art and may be employed as suitable without departing from the true spirit and scope of the invention. Such changes might involve alternative materials, components, structural arrangements, sizes, shapes, forms, functions, operational features or the like. Therefore, the above description and illustration should not be considered as limiting the scope of the invention, which is defined by the appended claims.

What is claimed is:

1. In a spring-loaded grease gun having a cylindrical barrel and a head cap assembly, said cylindrical barrel being sized to receive a grease cartridge and having first and second ends, said first end having an opening to receive a spring-loaded rod and the second end being threaded to receive said head cap assembly, the improvement comprising an adapter, said adapter having a cylindrical body and a threaded interior surface for mating with the threaded second end of said cylindrical barrel and an exterior surface having a plurality of rectangularly shaped protrusions, said head cap assembly having a pistol type dispenser appended to a cylindrical cup, said cylindrical cup having an interior surface sized to receive said cylindrical body of said adapter, said inner surface of said cylindrical cup comprising a plurality of cylindrical cup protrusions sized and positioned to mate with said rectangularly shaped protrusions emanating from the exterior surface of said adapter for frictionally joining said head cap assembly to said adapter.

2. The spring-loaded grease gun of claim 1 further comprising a resilient seal positioned within the interior of said cylindrical cup, said resilient seal being compressed when said rectangularly shaped protrusions mate with said plurality of cylindrical cup protrusions.

3. The spring-loaded grease gun of claim 1 wherein three rectangularly shaped protrusions are equally spaced on the exterior surface of said adapter.

4. The spring-loaded grease gun of claim 3 wherein three cylindrical cup protrusions are equally spaced on the interior surface of said cylindrical cup.

5. The spring-loaded grease gun of claim 4 wherein each of said cylindrical cup protrusions are characterized as having a leading edge sized for capturing a rectangularly shaped protrusion and for compressing said head cap assembly against said adapter by rotating said head cap assembly with respect to said adapter.

6. The spring-loaded grease gun of claim 1 further comprising a resilient seal positioned within said cylindrical cup.

7. The spring-loaded grease gun of claim 6 wherein said resilient seal is positioned such that it is compressed when said head cap assembly is applied to said adapter.

8. The spring-loaded grease gun of claim 1 wherein said head cap assembly is compressably joined to said adapter by interlocking said rectangularly shaped protrusions with said cylindrical cup protrusions by rotating said head cap assembly with regard to said adapter.

9. The spring-loaded grease gun of claim 1 wherein said pistol type dispenser comprises a first fixed lever arm and a second spring biased lever arm.

\* \* \* \* \*